Nov. 22, 1966     A. D. ALTEMILLER     3,286,300
COMBINATION STOP AND LATCH FOR MULTI-PURPOSE APPLIANCE
Filed July 10, 1964     2 Sheets-Sheet 1
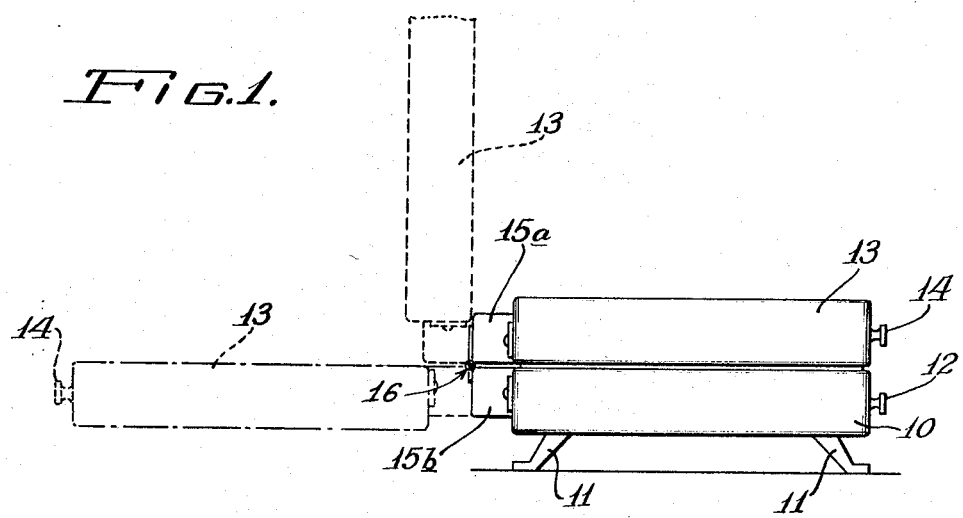
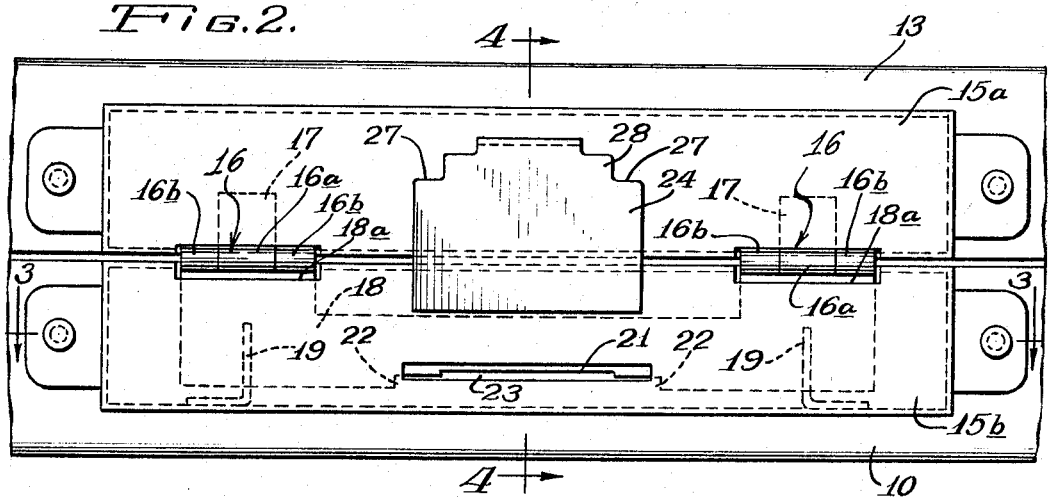
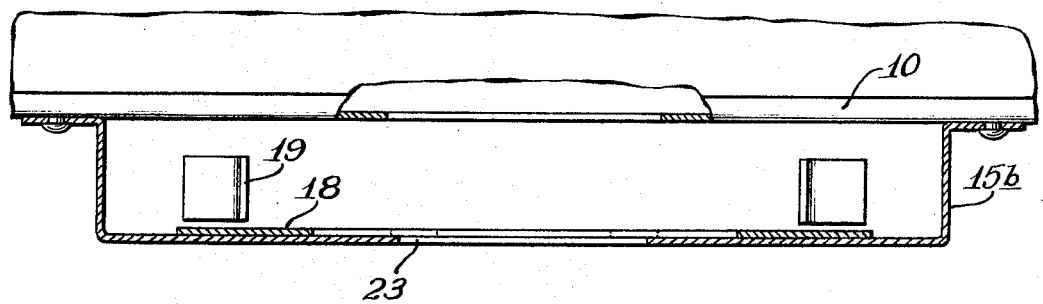
Inventor:
Arthur D. Altemiller
By Bair, Freeman & Molinare
Attys.

Nov. 22, 1966  A. D. ALTEMILLER  3,286,300
COMBINATION STOP AND LATCH FOR MULTI-PURPOSE APPLIANCE
Filed July 10, 1964  2 Sheets-Sheet 2
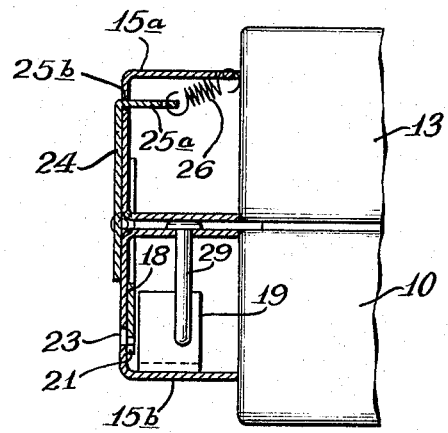
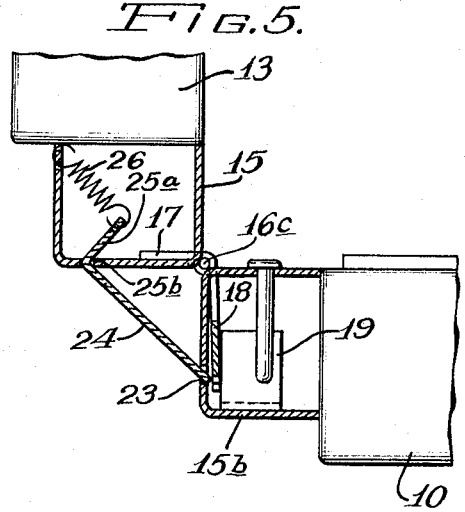
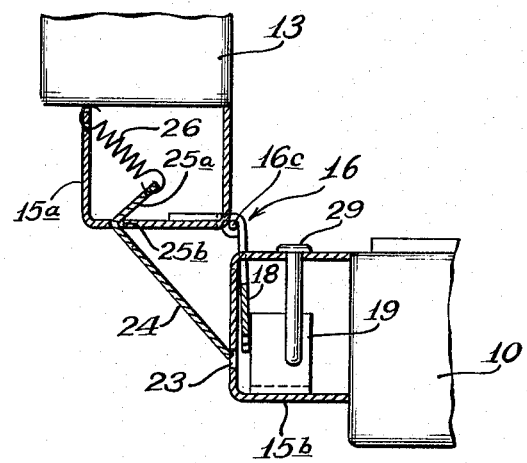
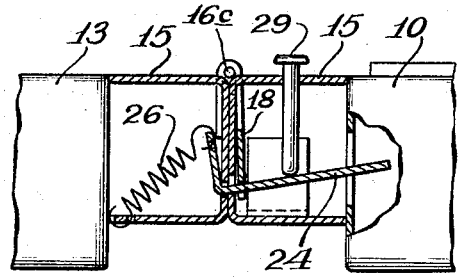
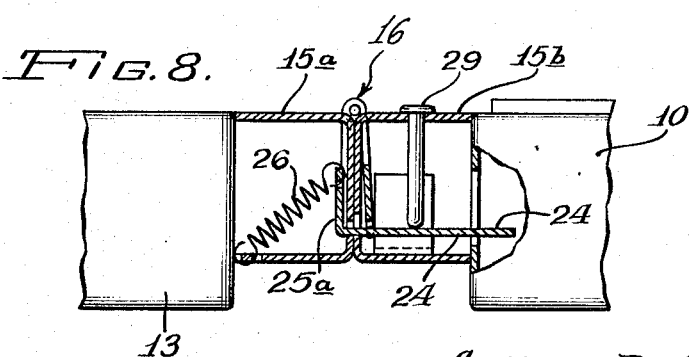
Inventor:
Arthur D. Altemiller
By Bair, Freeman & Molinare
Attys.

United States Patent Office 3,286,300
Patented Nov. 22, 1966

3,286,300
COMBINATION STOP AND LATCH FOR
MULTI-PURPOSE APPLIANCE
Arthur D. Altemiller, St. Louis, Mo., assignor to Knapp-Monarch Co., St. Louis, Mo., a corporation of Delaware
Filed July 10, 1964, Ser. No. 381,689
7 Claims. (Cl. 16—138)

This invention relates to a combined stop and latch for multi-purpose appliances, and more particularly to a hinge stop and latch structure for holding two sections of a multi-purpose appliance alternatively in positions at 90° to each other or in coplanar relationship.

Multi-purpose appliances such as waffle irons, sandwich toasters, grills and the like, are known where the appliance provides two sections in overlying position, as may be used in baking waffles or toasting sandwiches. For filling, the upper section is usually raised to a position at approximately 90° to the lower section and is preferably latched in such position so that it need not be held during the filling operation. Also, for using such appliances as a hot plate or warming tray or two-section grill, the two sections are alternatively arranged to lie side-by-side in coplanar relationship.

In addition to being able to latch the upper section in its 90° position relative to the lower section, it is highly desirable that the two sections be capable of being latched in their side-by-side coplanar relationship. With the latter arrangement, the appliance may be picked up by the handles at the ends thereof without the appliance collapsing or inadvertently folding.

It is accordingly one of the objects of the present invention to provide a combined stop and latch for multi-purpose appliances which functions alternatively to hold the sections in a position at 90° to each other, and which is also releasable to enable the sections to be moved into side-by-side coplanar relationship.

Another object is to provide a combined stop and latch for multi-purpose appliances by means of which the sections may be securely latched in side-by-side coplanar relationship, with additional means being provided for releasing the latch so that they can be returned to their overlapping position when desired.

According to a feature of the invention the alternative holding and latching functions are performed by a relatively simple hinge structure and strut member, which under one set of conditions engages one element of the hinge structure to stop the sections in their 90° position to each other, and which under other conditions cooperates with said element of the hinge structure to form a latch for holding the sections in side-by-side relationship.

The above and other objects and features of the invention will be more readily apparent from the following description when read in connection with the accompanying drawings, in which:

FIG. 1 is a side elevation of a multi-purpose appliance embodying the invention;

FIG. 2 is an enlarged fragmentary rear elevation view of the appliance of FIG. 1;

FIG. 3 is a fragmentary cross-sectional view taken on the line 3—3 of FIG. 2;

FIG. 4 is a fragmentary cross-sectional view taken on the line 4—4 of FIG. 2; and FIGS. 5, 6, 7 and 8 are views similar to FIG. 4 showing the parts of the invention in their different positions.

An appliance, as shown in FIG. 1, comprises a base section 10 supported on legs 11 at a desired height and provided on its front edge surface with an insulated handle 12. The lower section 10 preferably contains electrical heating elements (not shown), and may be formed with an upper surface of any desired configuration for performing some desired cooking operation. For example, the upper surface of the section 10 may be in the form of a waffle grid, or may be provided with smooth surfaced inserts for toasting sandwiches, or for warming or grilling operations.

An upper section 13 similar to the lower section 10 is hinged thereto at the rear edges of the sections and is provided at its forward edge with an insulated handle 14 through which it may be manipulated. Preferably the sections 10 and 13 are hinged together through box-like extensions 15a and 15b at the rear edges of the sections, which extensions carry the hinge structure and which may provide housing for electrical wiring and for thermostats or the like.

As shown, the hinge connection between the extensions includes a pair of hinge knuckles 16a having short upper hinge plates 17 extending into and rigidly secured to the upper extension 15a. The hinges further include hinge knuckles 16b carried by a unitary lower plate 18 extending through slots 18a at the upper rear corner of the lower extension 15b and freely slidable vertically through a limited degree of movement. The bottom of the lower section preferably has upwardly extending angle members 19 secured thereto and spaced from the rear wall of the lower extension 15b, and adapted to engage the lower hinge plate 18 to limit swinging movement thereof, while permitting said vertical sliding movement. As best seen in FIG. 2, the lower hinge plate 18 is formed in its central portion with an elongated notch 21 which lies centrally of a pair of stepped shoulders on corner notches 22 that are indented from the lower edge of the hinge plate. The rear upright surface of the lower extension 15b is formed with an elongated open slot 23 therein for a purpose to appear more fully hereinafter.

In use of the appliance the upper section 13 may be swung to an upright position at substantially 90° to the lower section as shown in dotted lines in FIG. 1, for the purpose of filling the appliance. Alternatively, the upper section may be swung to a position shown in dot-dash lines in FIG. 1, which it is in side-by-side coplanar relationship with the lower section 10. It will be understood, although not shown, that upper section 13 may be provided with legs for supporting it in the coplanar position illustrated in FIG. 1.

According to the present invention, stop and latch means are provided to alternatively hold the upper section in its upright dotted line position, or to latch the two sections together in their side-by-side coplanar position so that they can be handled as a substantially rigid unit. These stop and latch means, as best seen in FIGS. 4 to 8, comprise a combined stop-and-latch, or brace, plate 24 having an inturned flange or angle extension 25a of reduced width at its upper end and which extends through a relatively narrow slot 25b in the back wall of the upper extension 15a. A tension spring 26 connects the inturned terminus of flange 25a to the upper wall of extension 15a, thereby tending to hold plate 24 in the position shown in FIG. 4. Due to the fact that the lower hinge plate 18 can slide vertically, it will be seen that the upper and lower sections 10 and 13 can be separated vertically to a greater or lesser extent to accommodate the thickness of articles being cooked, such as waffles, sandwiches and the like. The length, or height, of plate 24 is such that at least a portion thereof overlies the back wall of lower extension 15b, for all spacings of sections 10 and 13.

When the upper section 13 is swung upwardly around hinge pins 16c toward the erect position, as shown in FIG. 5, the brace plate 24 engages the back wall of lower extension 15b and slides along the end wall of the lower section 15, at the same time pivoting in slot 25b, until the lower or distal edge of plate 24 reaches and enters the slot 23. The hinge plate 18 will at this time be in its lowered position, as shown in FIG. 5, and partially blocking slot 23, so that the lower edge of the brace plate 24 will engage hinge plate 18 to limit further swinging of the upper section 13. It will be noted that the center of gravity of the upper section 13 will be to the left of the hinge 16 in the position shown in FIG. 5 so that gravity will tend to move section 13 counterclockwise and thus holding the latch and stop plate against the hinge plate 18 to retain the upper and lower sections in their 90° position for loading.

To move the sections to their side-by-side coplanar relationship, the upper section is first pulled upwardly as shown in FIG. 6 to elevate the lower, or movable, hinge plate 18 above the level of the opening 23 to unblock same. At this time the lower end of brace plate 24 is able to swing into and through the opening 23 to the latched position shown in FIG. 7 in which the sections 10 and 13 are in the desired side-by-side coplanar relationship.

In order to latch the sections in this position, the brace plate 24 is reduced in width adjacent its upper portion to define indented latching shoulders 27 joining the lower full width portion of the stop and latch plate to a narrower upper portion 28. The narrower upper portion 28 is of a width to pass through the notch 21 defined in the lower edge of the hinge plate 18, and the shoulders 27 are of greater width than notch 21 so as to engage the latch plate at the sides of the notch 21 as shown in FIG. 7. It will be noted that when the stop and latch plate has been extended fully into the lower extension 15b in the position of FIG. 7, the bias of spring 26 tends to rock the brace plate 24 about slot-pivot 25b to bring narrow portion 28 thereof into the notch 21 so that the shoulders 27 will engage the inner surface of the lower hinge plate 18 to hold the sections 10 and 13 against swinging about hinge pins 16c toward each other. Therefore in the position of FIG. 7, the appliance can be picked up by lifting it through the handles 12 and 14 and can be moved from place to place as a substantially rigid unit without collapsing.

To release the latch so that the sections can again be moved to their normal overlying relationship, a push-button release pin 29 is provided slidably mounted in the upper wall of the lower extension 15b in a position to have its lower end engage and depress the brace plate 24. When the sections are initially moved to their side-by-side coplanar position and the plate 24 is swung upwardly, as shown in FIG. 7, the button head of pin 29 will be raised slightly above the upper wall of the lower extension 15b. To release the latch the pin 29 is depressed as shown in FIG. 8 to swing the plate 24 downwardly, thereby swinging the shoulders 27 to a position below the sides of the notch 21. At this time the upper section 13 can be swung clockwise, as seen in FIGS. 7 and 8, thereby withdrawing plate 24 through slot 23 and permitting return of section 13 to its normal position overlying the lower section 10.

While one embodiment of the invention has been shown and described in detail, it will be understood that this is illustrative only and is not to be taken as a definition of the scope of the invention, reference being had for this purpose to the appended claims.

What is claimed is:

1. A stop-and-latch mechanism for a multi-purpose appliance having multiple sections adapted for movement between alternative positions where pairs of sections are overlying each other, or are substantially at right angles to each other, or are in side-by-side coplanar position, said stop and latch mechanism comprising, in combination, a pair of appliance sections, a two-part hinge providing one hinge part secured to a first of the sections and the other hinge part slidably associated with the second of the sections, an opening in the second section arranged to be selectively blocked or unblocked by the other hinge part, an elongated brace plate carried by the first section and having a distal end for insertion into said opening to engage said other hinge part to define the right angle position for said two-section appliance, and the selective movement of said other hinge part to unblock said opening permitting insertion of substantially the entire brace through said opening to define the alternative coplanar position for the two sections of the appliance.

2. A device as in claim 1 including means resiliently urging the distal end of the brace plate against the second appliance section, so that during pivoting between the sections from the overlying position, the distal end of the brace plate slides along the second appliance section until it reaches the opening therein, thereby locating the right angle position between the two sections.

3. A stop-and-latch mechanism for a multi-purpose appliance having multiple sections adapted for movement between alternative positions where pairs of sections are overlying each other, or are substantially at right angles to each other, or are in side-by-side coplanar position, said stop and latch mechanism comprising, in combination, a pair of appliance sections, a two-part hinge providing one hinge part secured to a first of the sections and the other hinge part slidably associated with the second of the sections, an opening in the second section arranged to be selectively blocked or unblocked by the other hinge part, an elongated brace plate carried by the first section and having a distal end for insertion into said opening to engage said other hinge part to define the right angle position for said two-section appliance, the selective movement of said other hinge part to unblock said opening permitting insertion of substantially the entire brace through said opening to define the alternative coplanar position for the two sections of the appliance, and there being interlocking elements on said brace plate and said other hinge part for latching together the sections in said coplanar position to define a substantially rigid assembly.

4. The device of claim 3 including a manually operable member engageable with the brace plate to disengage same from the other hinge part, whereby the said sections can be folded away from their side-by-side coplanar position.

5. A device as in claim 3 including resilient means normally biasing said latching parts into latching engagement with each other.

6. A stop-and-latch mechanism for a multi-purpose appliance having multiple sections adapted for movement between alternative positions where pairs of sections are overlying each other, or are substantially at right angles to each other, or are in side-by-side coplanar position, said stop and latch mechanism comprising, in combination, a pair of appliance sections, a two-part hinge providing one hinge part secured to a first of the sections and the other hinge part slidably associated with the second of the sections, an opening in the second section arrange to be selectively blocked or unblocked by the other hinge part, an elongated brace plate carried by the first section and having a distal end for insertion into said opening to engage said other hinge part to define the right angle position for said two-section appliance, and the selective movement of said other hinge part to unblock said opening permitting insertion of substantially the entire brace through said opening to define the alternative coplanar position for the two sections of the appliance, said brace plate having a flange at the upper end thereof, a pivot slot defined in the first section through which said flange extends, a spring engaging the flange and first section to bias said brace plate to pivot in said pivot slot so as to bias the distal end of the brace plate toward the second appliance section.

7. A device as in claim 6 wherein the brace plate is notched at the end thereof adjacent the pivot slot, and the lower edge of the other hinge part is notched, so that the notched portions of the brace plate and other hinge part interlock to latch the sections together in said coplanar position.

No references cited.

BOBBY R. GAY, *Primary Examiner.*

D. L. TROUTMAN, *Assistant Examiner.*